(12) United States Patent
Negami (10) Patent No.: US 11,136,448 B2
(45) Date of Patent: Oct. 5, 2021

(54) RUBBER COMPOSITION FOR TORSIONAL DAMPER AND TORSIONAL DAMPER

(71) Applicant: NOK CORPORATION, Tokyo (JP)

(72) Inventor: Tetsuro Negami, Tottori (JP)

(73) Assignee: NOK CORPORATION

( * ) Notice: Subject to any disclaimer, the term of this patent is extended or adjusted under 35 U.S.C. 154(b) by 77 days.

(21) Appl. No.: 16/655,854

(22) Filed: Oct. 17, 2019

(65) Prior Publication Data

US 2020/0048446 A1 Feb. 13, 2020

Related U.S. Application Data

(63) Continuation of application No. PCT/JP2018/016327, filed on Apr. 20, 2018.

(30) Foreign Application Priority Data

Apr. 21, 2017 (JP) .............................. JP2017-084566

(51) Int. Cl.
*C08L 23/16* (2006.01)
*F16F 15/126* (2006.01)
*F16H 55/36* (2006.01)

(52) U.S. Cl.
CPC ............ *C08L 23/16* (2013.01); *F16F 15/126* (2013.01); *C08L 2207/324* (2013.01); *C08L 2312/00* (2013.01); *F16H 55/36* (2013.01); *F16H 2055/366* (2013.01)

(58) Field of Classification Search
CPC ................. C08L 23/16; C08L 2312/00; C08L 2207/324; F16F 15/126; F16H 55/36
USPC ........................................................ 524/525
See application file for complete search history.

(56) References Cited

U.S. PATENT DOCUMENTS 3,399,104 A * 8/1968 Ball, III .................. C08K 3/04
428/116
2016/0177076 A1* 6/2016 Negami .................. C08L 23/16
524/495

FOREIGN PATENT DOCUMENTS

| CN | 104877238 A | 9/2015 |
| EP | 2927269 A1 | 10/2015 |
| JP | H02-058552 A | 2/1990 |
| JP | 06327188 A * | 11/1994 |
| JP | H06-327188 A | 11/1994 |
| JP | 2003-128850 A | 5/2003 |
| JP | 2008-215603 A | 9/2008 |
| JP | 2008215603 A * | 9/2008 |
| JP | 2009-197115 A | 9/2009 |
| WO | WO-2015/012018 A1 | 1/2015 |

OTHER PUBLICATIONS

International Search Report and Written Opinion for Patent Application No. PCT/JP2018/016327 dated Jul. 17, 2018 (7 pages).
Japanese Office Action for Patent Application No. JP 2018-548467 dated Nov. 12, 2018 (6 pages).
Extended European Search Report for Patent Application No. EP 18787674.3 dated Sep. 15, 2020 (5 pages).
Extended European Search Report for Patent Application No. JP 18787674.3 dated Sep. 15, 2020 (5 pages).
English translation of Written Opinion of the International Search Authority for International Application No. PCT/JP2018/016327 dated Oct. 22, 2019 (5 pages).

* cited by examiner

*Primary Examiner* — Hui H Chin
(74) *Attorney, Agent, or Firm* — Harness, Dickey & Pierce, P.L.C.

(57) ABSTRACT

A rubber composition for a torsional damper has (A) a minimum value of tan δ at −30° C. to 120° C. of 0.140 or more, (B) a ratio of tan δ at −30° C. to tan δ at 60° C. of 3.5 or less, and (C) a ratio of E' at −30° C. to E' at 60° C. of 21 or less.

10 Claims, 1 Drawing Sheet

RUBBER COMPOSITION FOR TORSIONAL DAMPER AND TORSIONAL DAMPER

CROSS REFERENCE TO RELATED APPLICATIONS

The present application is a continuation application of International Patent Application No. PCT/JP2018/016327 filed on Apr. 20, 2018, which claims priority to Japanese Patent Application No. 2017-084566, filed on Apr. 21, 2017. The contents of the above applications are incorporated herein by reference in their entirety.

BACKGROUND

Technical Field

The present disclosure relates to a rubber composition for a torsional damper, and particularly relates to a rubber composition for a torsional damper, the composition achieving high damping performance and having an excellent balance among physical properties required for the torsional damper and excellent product durability and compound processability.

Background Art

A torsional damper (TVD) is attached to a crankshaft for the purpose, for example, of reducing engine vibration (reducing torsional vibration of crankshaft).

For example, the torsional damper has a configuration in which a hub to be attached to a shaft end of the crankshaft is joined to an annular mass member disposed on the outer periphery thereof through an elastic body made of rubber.

Positive acceleration and negative acceleration are alternately generated in the crankshaft accompanying driving of an engine, resulting in generation of a natural frequency. On the other hand, the mass member installed on the crankshaft tends to continue rotating at a constant rotational speed. Thus, the interposed torsional damper is required to have a function of absorbing a change in angular speed between the crankshaft and the mass member.

Accordingly, main functions of the torsional damper include: matching a natural frequency of the torsional damper to the natural frequency generated in the crankshaft accompanying the driving of the engine, thereby reducing the vibration of the crankshaft; and transmitting power to auxiliary machines (such as an alternator and an air conditioner) through a belt.

In order for the torsional damper to exhibit these functions, the following functions are required for a rubber material to be used for the torsional damper.

(1) To tune the natural frequency, the rubber material used for the torsional damper is required to have hardness variation (type A durometer) of about 50° to about 80° in terms of Hs.

(2) A small change in the natural frequency depending on working temperature is required, and therefore the rubber material is required to have satisfactory temperature dependence of a spring constant (temperature dependence of E' (vibration characteristic)).

(3) To reduce the vibration of the crankshaft, the rubber material is required to have large tan δ (damping characteristic) in a wide temperature region.

(4) A working region of the torsional damper exceeds 100° C. on the high temperature side, and therefore having satisfactory heat resistance and durability at high temperatures are also required.

Among others, the temperature dependence of E' is considered as important in a conventional rubber material for a torsional damper. The vibration is reduced by matching the natural frequency of the torsional damper to the natural frequency of the crankshaft. Therefore, if the temperature dependence of E' of the rubber material is unsatisfactory, deviation between the natural frequencies of the crankshaft and the torsional damper occurs by an influence of an environment, so that the vibration cannot be reduced to a satisfying level. It is generally known that making the temperature dependence of E' satisfactory impairs tan δ, which is an index of reduction in vibration.

Therefore, variation in amplification of the vibration due to the deviation between the natural frequencies can be made small by making the temperature dependence of E' of the rubber material satisfactory, but there has been a tendency that the vibration of the crankshaft as a whole becomes worse.

If tan δ is made large, the temperature dependence of E' becomes worse, so that the amplification of the vibration due to the deviation between the natural frequencies occurs to bring about a problem.

In WO 2015-012018, there is described an EPDM composition for a torsional damper, the composition achieving high damping performance, having a hardness Hs of 50° to 80°, having satisfactory temperature dependence of a spring constant, satisfactory hot physical properties at high temperatures, and repulsive stress less degraded due to fitting compression at the time of manufacturing, and having an excellent balance among physical properties suitable for the torsional damper.

In WO 2015-012018, high damping performance is enabled by the use of carbon black and a liquid polyolefin oligomer.

On the other hand, it has been made clear by experiments of the present inventor that in the case of the EPDM composition for a torsional damper described in WO 2015-012018, wherein carbon black is used, there is a tendency that the product durability is deteriorated as the amount (proportion) of carbon black blended is increased. On this occasion, a situation in which the amount of carbon black to be blended has to be made small can occur in consideration of the deterioration in the product durability. In this case, when the amount of carbon black to be blended is made small, necessity of realizing considerably high damping performance by another means has arisen.

Accordingly, there has been room for further improvements with respect to the EPDM composition for a torsional damper, the composition enabling considerably high damping performance without deteriorating the product durability.

In addition, with respect to the liquid polyolefin oligomer, the high damping performance is enabled, but when the amount thereof blended is increased, tackiness of a compound is increased with the increase, and therefore there has been room for further improvements in processability (discharge characteristic at the time of kneading and roll processability). Therefore, in the case where the amount of the liquid polyolefin oligomer to be blended is increased for the purpose of enhancing the damping performance, there has been a need to consider the processability, too.

Thus, the present disclosure is related to providing a rubber composition for a torsional damper, the composition achieving high damping performance and having an excellent balance among physical properties required for the torsional damper and excellent product durability and compound processability.

In addition, the present disclosure will be made clear by the following description.

SUMMARY

Aspects of the present disclosure are as follows.

In a first aspect, a rubber composition for a torsional damper, has:

(A) a minimum value of tan δ at −30° C. to 120° C. of 0.140 or more;

(B) a ratio of tan δ at −30° C. to tan δ at 60° C. of 3.5 or less; and (C) a ratio of E' at −30° C. to E' at 60° C. of 21 or less.

In a second aspect, the rubber composition for a torsional damper according to the first aspect, also contains:

(a) at least one polymer selected from the group consisting of EPM, EPDM, and EBDM;

(b) at least one liquid polyolefin oligomer;

(c) at least one graphite; and (d) a peroxide-based crosslinking agent, wherein the rubber composition has a content of propylene and butene of 35 to 55 wt % based on a sum of a total amount of ethylene and propylene in EPM and EPDM each being the polymer of (a) and a total amount of ethylene and butene in EBDM being the polymer of (a), and contains:

5 to 50 parts by weight of the liquid polyolefin oligomer of (b) being a liquid polyolefin oligomer having a number average molecular weight Mn in a range of 3,000 to 4,000;

3 to 50 parts by weight of the graphite of (c); and 0.8 to 3.5 parts by weight of the peroxide-based crosslinking agent of (d), based on 100 parts by weight of the polymer of (a).

In a third aspect, the liquid polyolefin oligomer of (b) of the rubber composition for a torsional damper according to the second aspect is an ethylene-α-olefin oligomer.

In a fourth aspect, the ethylene-α-olefin oligomer of the rubber composition for a torsional damper according to the third aspect is an ethylene-α-olefin oligomer having a number average molecular weight Mn of 3,000 to 3,700, a kinetic viscosity at 100° C. of 2,000 mm$^2$/s, a viscosity index of 300, and a sulfur content of less than 0.1% by mass.

In a fifth aspect, the graphite of the rubber composition for a torsional damper according to the second aspect is a flake graphite.

In a sixth aspect, a torsional damper includes the rubber composition for a torsional damper according to the first aspect.

According to the present disclosure, a rubber composition for a torsional damper, the composition achieving high damping performance and having an excellent balance among physical properties required for the torsional damper and having excellent product durability and compound processability, can be provided.

DETAILED DESCRIPTION

Hereinafter, embodiments of the present disclosure will be described.

EPM, EPDM, or EBDM

The polymer of (a) to be used in the present embodiments is not particularly limited as long as it satisfies the above-described (A) to (C), but it is preferable to use at least one selected from the group consisting of an EPM (ethylene/propylene copolymer) polymer, an EPDM (ethylene/propylene/nonconjugated diene terpolymer) polymer, and an EBDM (ethylene/butene/nonconjugated diene terpolymer) polymer. That is, as the polymer of (a), any one of the EPM polymer, the EPDM polymer, and the EBDM polymer may be used singly, or these may be mixed for use. Typically, the polymer of (a) is in the form of a solid.

In the present embodiments, it is preferable that the content of propylene and butene be 35 to 55 wt % based on the sum of the total amount of ethylene and propylene in EPM and EPDM each being the polymer of (a) and the total amount of ethylene and butene in EBDM being the polymer of (a). The "content of propylene and butene" (hereinafter, sometimes referred to as (C3, C4) content) in each aspect is described below.

In the case where EPM, EPDM, and EBDM are used as the polymer of (a)

($C3,C4$) content=(amount of propylene in $EPM$+ amount of propylene in $EPDM$+amount of butene in $EBDM$)/(total amount of ethylene and propylene in $EPM$+total amount of ethylene and propylene in $EPDM$+total amount of ethylene and butene in $EBDM$)×100

In the case where EPM and EPDM are used as the polymer of (a)

($C3,C4$) content=(amount of propylene in $EPM$+ amount of propylene in $EPDM$)/(total amount of ethylene and propylene in $EPM$+total amount of ethylene and propylene in $EPDM$)×100

In the case where EPM and EBDM are used as the polymer of (a)

($C3,C4$) content=(amount of propylene in $EPM$+ amount of butene in $EBDM$)/(total amount of ethylene and propylene in $EPM$+total amount of ethylene and butene in $EBDM$)×100

In the case where EPDM and EBDM are used as the polymer of (a)

($C3,C4$) content=(amount of propylene in $EPDM$+ amount of butene in $EBDM$)/(total amount of ethylene and propylene in $EPDM$+total amount of ethylene and butene in $EBDM$)×100

By using the above-described polymer of (a), striking a balance among heat resistance, cold resistance, durability, the temperature dependence of a spring constant (temperature dependence of E'), the repulsive stress can be realized.

As a more preferred aspect in the present embodiments, the (C3, C4) content is 38 to 55 wt %, and still more preferably 40 to 55 wt %.

Examples of the polymer of (a) of the present embodiments which is a commercially available product include trade name "EP33 (EPDM)" manufactured by JSR Corporation and "EBT K-9330M (EBDM)" manufactured by Mitsui Chemicals, Inc.

Liquid Polyolefin Oligomer

In the present embodiments, it is preferable that the rubber composition for a torsional damper contain at least one liquid polyolefin oligomer.

More preferably, the liquid polyolefin oligomer in the present embodiments is an ethylene-α-olefin oligomer.

The liquid polyolefin oligomer having a number average molecular weight Mn in a range of 3,000 to 4,000 is preferable, more preferably, the liquid polyolefin oligomer having a number average molecular weight Mn in a range of 3,000 to 3,900 is used, and still more preferably, the liquid polyolefin oligomer having a number average molecular weight Mn in a range of 3,000 to 3,800 is used.

When the number average molecular weight Mn of the liquid polyolefin oligomer is 3,000 or more, the damping characteristic is satisfactory, and when the number average molecular weight Mn is 4,000 or less, a low temperature characteristic is satisfactory.

The liquid polyolefin oligomer is added in a proportion of preferably 5 to 50 parts by weight and more preferably 10 to 50 parts by weight per 100 parts by weight of the polymer of (a).

When the amount of the liquid polyolefin oligomer is 5 parts by weight or more, an effect of the high damping performance is large, and kneadability is satisfactory, and when the amount of the liquid polyolefin oligomer is 50 parts by weight or less, a problem does not occur with respect to kneading.

It is preferable that the liquid polyolefin oligomer to be used in the present embodiments be an ethylene-α-olefin oligomer having a number average molecular weight Mn: 3,000 to 3,700, a kinetic viscosity at 100° C. of 2,000 mm$^2$/s, a viscosity index of 300, and a sulfur content of less than 0.1% by mass. Examples of such a liquid polyolefin oligomer include "LUCANT HC 2000" manufactured by Mitsui Chemicals, Inc.

Graphite

In the present embodiments, it is preferable that the rubber composition for a torsional damper contain at least one graphite.

Examples of the graphite include expanded graphite, swelled graphite, flake graphite, and earthy graphite.

The expanded graphite is obtained in such a way that a graphite intercalation compound obtained by intercalating a substance in flake graphite using a chemical reaction is heated rapidly to combust and gasify the substance which has been intercalated, and the discharge of the gas thereby expands intervals between layers explosively to allow the intervals between layers to expand in a direction of a stack of the layers.

The swelled graphite is obtained by expanding the expanded graphite, pressing a resultant into a sheet, and pulverizing the sheet.

The flake graphite includes flake graphite containing a carbonaceous material adhering to at least part of the surface thereof and flake graphite in which a carbonaceous material includes a metal oxide inside thereof or at a surface thereof, and any of them can be used.

The earthy graphite is a mineral the appearance of which is earthy or clod-like, the mineral having a metallic luster of a black color.

In the present embodiments, the flake graphite is preferable among the above-described types of graphite, and, for example, "CPB-3S" manufactured by Chuetsu Graphite Works Co., Ltd. can be used.

The graphite may be added in a proportion of 3 to 50 parts by weight, preferably 3 to 30 parts by weight, and more preferably 3 to 20 parts by weight per 100 parts by weight of the polymer of (a). This is because when the amount of the graphite is 3 parts by weight or more, an effect of improving the kneadability and the roll processability can be obtained, and when the amount is 50 parts by weight or less, a problem does not occur with respect to dispersibility at the time of kneading and mold contamination.

Peroxide-Based Crosslinking Agent

The peroxide-based crosslinking agent of (d) to be blended in the rubber composition for a torsional damper of the present embodiments may be added in a proportion of 0.8 to 3.5 parts by weight, preferably 1.0 to 3.5 parts by weight, and more preferably 1.0 to 3.0 parts by weight per 100 parts by weight of the polymer of (a).

When the parts by weight of the peroxide-based crosslinking agent are 0.8 parts by weight or more, vulcanization molding is satisfactory, and when the parts by weight are 3.5 parts by weight or less, the effect of the high damping performance is large and the temperature dependence of tan δ is satisfactory.

As the peroxide-based crosslinking agent, an organic peroxide-based crosslinking agent is preferable, and, for example, 2,5-dimethylhexane-2,5-dihydroperoxide, 2,5-dimethyl-2,5-di(benzoylperoxy)hexane, tertiary butyl peroxide, dicumyl peroxide, tertiary butyl cumyl peroxide, 1,1-di(tertiary butylperoxy)-trimethylcyclohexane, 2,5-dimethyl-2,5-di(tertiary butylperoxy)hexane, 2,5-dimethyl-2,5-di(tertiary butylperoxy)hexyne-3,1,3-di(tertiary butylperoxyisopropyl)benzene, tertiary butyl peroxybenzoate, tertiary butylperoxy isopropyl carbonate, and n-butyl-4,4-di(tertiary butylperoxy)valerate and the like are used.

Additional Additives

Carbon black, a plasticizer, and the like in addition to the graphite can be blended in the rubber composition for a torsional damper of the present embodiments.

Carbon Black

In the present embodiments, carbon black that can be used in the rubber composition for a torsional damper is not particularly limited, and, commercially available products, such as, for example, "SHOBLACK" manufactured by Showa Cabot K.K., can be used.

It is preferable that the carbon black be added in a range of 10 to 120 parts by weight per 100 parts by weight of the polymer of (a).

Plasticizer

As the plasticizer, for example, petroleum-based softeners such as process oil, lubricating oil, and paraffin-based oil, fatty oil-based softeners such as castor oil, linseed oil, rapeseed oil, and coconut oil, ester-based plasticizers such as dibutyl phthalate, dioctyl phthalate, dioctyl adipate, and dioctyl sebacate, and hydrocarbon-based oligomers and the like can be used.

Other Additives

As other additives other than those described above, an antiaging agent (for example, polymerized-2,2,4-trimethyl-1,2-dihydroquinone and 2-mercaptobezoimidazole), an auxiliary agent (for example, zinc oxide and stearic acid), an acid acceptor such as hydrotalcite, and the like may be used in the rubber composition for a torsional damper of the present embodiments.

Method for Producing Rubber Composition for Torsional Damper

To produce the rubber composition for a torsional damper in the present embodiments, an uncrosslinked rubber composition is first prepared. The rubber composition can be prepared by kneading predetermined raw materials using, for example, a kneading machine such as an intermix, a kneader, or a Banbury mixer, or an open roll.

Thereafter, the prepared compound is heated generally at about 150 to 200° C. for about 3 to 60 minutes using a vulcanization press, a compression molding machine, an injection molding machine, or the like to perform primary vulcanization or primary crosslinking.

Thereafter, if necessary, secondary vulcanization or secondary crosslinking can also be performed by vulcanization with an oven at about 120 to 200° C. for about 1 to 24 hours, or the like. A torsional damper of the present embodiments is obtained using the rubber composition for a torsional damper, prepared by the above-described crosslinking.

Physical Properties of Rubber Composition for Torsional Damper

The rubber composition for a torsional damper of the present embodiments has the above-described constitution and therefore has physical properties: (A) a minimum value of tan δ at −30° C. to 120° C. of 0.140 or more; (B) a ratio of tan δ at −30° C. to tan δ at 60° C. of 3.5 or less; and (C) a ratio of E' at −30° C. to E' at 60° C. of 21 or less.

The vibration characteristic (E') is also called storage modulus and is obtained as a viscoelastic spectrum when vibration is loaded to the rubber composition for a torsional damper.

In addition, the viscoelastic spectrum of loss modulus (E'') can be obtained by measuring the dynamic viscoelasticity of the rubber composition for a torsional damper in the same manner as described above. The damping characteristic (tan δ) can be determined by calculating E''/E' from E' and E'' thus obtained. The damping characteristic (tan δ) is also called loss tangent.

The vibration characteristic (E'), the ratio of (E' at −30° C.)/(E' at 60° C.), the damping characteristic (tan δ), the ratio of (tan δ at −30° C.)/(tan δ at 60° C.), and the like can be controlled by adjusting the composition of the rubber composition for a torsional damper, the types of the raw materials, the crosslinking density, and the like. For example, the above-described characteristics can be controlled by adjusting (a) the chemical structure, the number average molecular weight, and the content of the polymer, (b) the chemical structure, the number average molecular weight, and the content of the liquid polyolefin oligomer, and (d) the type, the content, and the crosslinking density of the crosslinking agent, and the like.

The rubber composition for a torsional damper, having the above-described physical properties, achieves high damping performance and has an excellent balance among physical properties required for the torsional damper and excellent product durability and compound processability.

To determine the damping characteristic (tan δ) of (A), a viscoelastic spectrometer "DVE-V4" manufactured by UBM is used to measure tan δ at 100 Hz at −30° C. to 120° C. under a tensile condition. The rubber composition for a torsional damper having tan δ of 0.140 or more can be evaluated as satisfactory at any temperature, and the tan δ is preferably 0.150 or more, and still more preferably 0.160 or more.

The damping characteristic (tan δ) of (B) refers to the temperature dependence of the damping characteristic, and to determine the damping characteristic (tan δ) of (B), the viscoelastic spectrometer "DVE-V4" manufactured by UBM is used to measure tan δ at 100 Hz at −30° C. to 120° C. under a tensile condition. The rubber composition for a torsional damper having a ratio of tan δ at −30° C. to tan δ at 60° C. (−30° C./60° C.) of 3.5 or less can be evaluated as satisfactory.

The temperature characteristic of the vibration characteristic (E') of (C) is to have a physical property, a ratio of E' at −30° C. to E' at 60° C. of 21 or less. The storage modulus (E') at 100 Hz is measured at −30 to 120° C. under a tensile condition using the viscoelastic spectrometer "DVE-V4" manufactured by UBM. The rubber composition for a torsional damper having a ratio of E' at −30° C. to E' at 60° C. (E'(−30° C.)/E'(60° C.)) of 21 or less, preferably 16 or less, and still more preferably 12 or less can be evaluated as satisfactory.

In the present embodiments, the absolute value of tan δ of the rubber material at 60° C. is made large, and the temperature dependence of tan δ (ratio of tan δ to tan δ at 60° C.), which has not conventionally been considered as important, is made satisfactory. Thereby, firstly, the vibration of the crankshaft can be reduced. That is, capable of making tan δ large enables reduction in the vibration of the crankshaft.

Secondly, the temperature dependence of the natural frequency of a product can be made satisfactory. With respect to strain dependence of E' of the rubber material, the larger the strain amount is, the smaller E' is due to a Payne effect, and therefore the smaller the temperature dependence of the strain amount (temperature dependence of tan δ) is, the more satisfactory the temperature dependence of the natural frequency of a product is made.

From those described above, the temperature dependence of the natural frequency as a product can be made satisfactory, and the vibration of the crankshaft as a whole can be reduced by making the absolute value of tan δ at normal working region (60° C.) of the torsional damper large and making the temperature dependence of tan δ in terms of the ratio of tan δ to tan δ at 60° C. small.

Torsional Damper

Figure 1A:
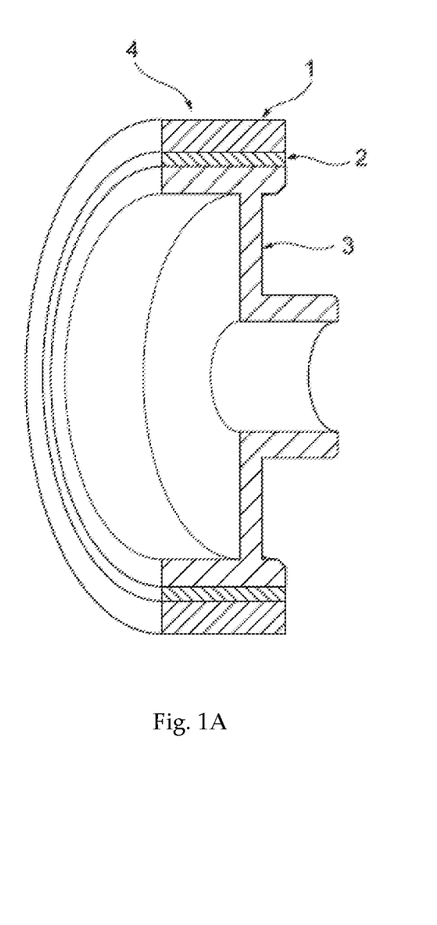
FIGS. 1A and 1B are diagrams illustrating a torsional damper according to the present embodiments.
Figure 1B:
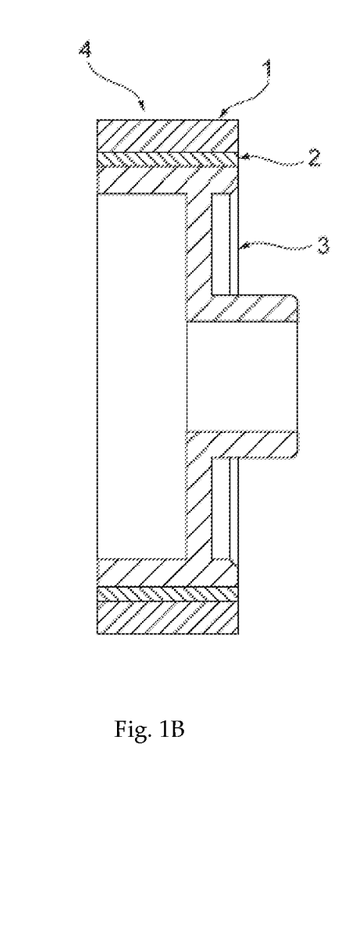

FIGS. 1A and 1B are diagrams illustrating a torsional damper including the rubber composition for a torsional damper of the present embodiments, FIG. 1A illustrates a perspective view, and FIG. 1B illustrates a sectional view. As illustrated in FIGS. 1A and 1B, the torsional damper 4 includes a hub 3 to be attached to a crankshaft of an automobile engine, the rubber composition 2 for a torsional damper of the present embodiments on the outer peripheral surface of the hub 3, and a vibration ring 1 connected onto the outer peripheral surface of the rubber composition 2 for a torsional damper. The torsional damper has a structure in which a pulley groove (not illustrated in figures) for tensely winding a timing belt is provided at the outer peripheral surface of the vibration ring 1 to transmit running torque to auxiliary machines through the timing belt tensely wound in the pulley groove. The rubber composition for a torsional damper of the present embodiments has the characteristics of (A) to (C) and therefore can make the temperature dependence of the natural frequency satisfactory and can reduce the vibration of the crankshaft as a whole.

EXAMPLES

Hereinafter, the present disclosure will be described based on Examples, but the present disclosure is not limited by these Examples.

Example 1

| | |
|---|---|
| (a) polymer: EPDM-1 ("JSR EP33" manufactured by JSR Corporation) | 100 parts by weight |
| Liquid polyolefin oligomer (number average molecular weight Mn: 3,000 to 3,700) ("LUCANT HC 2000" manufactured by Mitsui Chemicals, Inc.) | 20 parts by weight |
| Graphite ("CPB-3S" manufactured by Chuetsu Graphite Works Co., Ltd.) | 10 parts by weight |
| HAF carbon black ("SHOBLACK N330-L" manufactured by Showa Cabot K.K. | 80 parts by weight |
| Peroxide-based crosslinking agent (dicumyl peroxide (DCP)) | 1 part by weight |

Those components described above were kneaded with a kneader and an open roll to obtain an unvulcanized compound, thereafter the unvulcanized compound was subjected to primary crosslinking using a compression molding machine under conditions of a temperature of 180° C. and a compression time of 6 minutes, and further, a resultant was subjected to secondary crosslinking by applying a heat treatment of 150° C. for 5 hours in a heating oven, thereby molding a sample of a rubber composition for a torsional damper, the sample being a specimen and having a thickness of 2 mm.

Example 2

A sample of a rubber composition for a torsional damper was molded in the same manner as in Example 1 except that the amount of the peroxide-based crosslinking agent (DCP) blended was changed as shown in Table 1 in Example 1.

Example 3

A sample of a rubber composition for a torsional damper was molded in the same manner as in Example 1 except that the amount of the peroxide-based crosslinking agent (DCP) blended was changed as shown in Table 1 in Example 1.

Example 4

A sample of a rubber composition for a torsional damper was molded in the same manner as in Example 1 except that the amount of the peroxide-based crosslinking agent (DCP) blended was changed as shown in Table 1 in Example 1.

Example 5

A sample of a rubber composition for a torsional damper was molded in the same manner as in Example 1 except that the amount of the peroxide-based crosslinking agent (DCP) blended was changed as shown in Table 1 in Example 1.

Example 6

A sample of a rubber composition for a torsional damper was molded in the same manner as in Example 2 except that the amount of the liquid polyolefin oligomer blended was changed as shown in Table 1 in Example 2.

Example 7

A sample of a rubber composition for a torsional damper was molded in the same manner as in Example 2 except that the amount of the liquid polyolefin oligomer blended was changed as shown in Table 1 in Example 2.

Example 8

A sample of a rubber composition for a torsional damper was molded in the same manner as in Example 2 except that the amount of the liquid polyolefin oligomer blended was changed as shown in Table 1 in Example 2.

Example 9

A sample of a rubber composition for a torsional damper was molded in the same manner as in Example 2 except that the amount of the graphite blended was changed as shown in Table 1 in Example 2.

Example 10

A sample of a rubber composition for a torsional damper was molded in the same manner as in Example 2 except that the amount of the graphite blended was changed as shown in Table 1 in Example 2.

Example 11

A sample of a rubber composition for a torsional damper was molded in the same manner as in Example 2 except that EBDM-1 ("EBT K-9330M" manufactured by Mitsui Chemicals, Inc.) was used in place of EPDM-1 in Example 2.

Comparative Example 1

A sample of a rubber composition for a torsional damper was molded in the same manner as in Example 1 except that the amount of the peroxide-based crosslinking agent (DCP) blended was changed as shown in Table 2 in Example 1.

Comparative Example 2

A sample of a rubber composition for a torsional damper was molded in the same manner as in Example 6 except that the graphite was not blended in Example 6.

Comparative Example 3

A sample of a rubber composition for a torsional damper was molded in the same manner as in Example 2 except that the liquid polyolefin oligomer was not blended in Example 2.

Comparative Example 4

A sample of a rubber composition for a torsional damper was molded in the same manner as in Example 5 except that the liquid polyolefin oligomer was not blended in Example 5.

Comparative Example 5

A sample of a rubber composition for a torsional damper was molded in the same manner as in Example 2 except that the polymer was changed to EPDM-2 ("EP51" manufactured by JSR Corporation) and the (C3, C4) content was changed to 28.9 wt % in Example 2.

Comparative Example 6

A sample of a rubber composition for a torsional damper was molded in the same manner as in Example 5 except that the graphite was not used in Example 5.

Comparative Example 7

A sample of a rubber composition for a torsional damper was molded in the same manner as in Example 5 except that the carbon black was changed to ISAF-LS carbon black ("SEAST 600" manufactured by TOKAI CARBON CO., LTD.), and the graphite was not used in Example 5.

Evaluation Method

The physical properties of the obtained specimens were measured by the following methods, and the measurement results are shown in Tables 1 and 2.

1. Temperature Characteristic of Vibration Characteristic (E')

(1) The storage modulus E' at 100 Hz was measured at −30 to 120° C. under a tensile condition using the viscoelastic spectrometer "DVE-V4" manufactured by UBM. The measurement of the viscoelasticity was conducted in accordance with JIS K6394, which corresponds to ISO 4664-1. Shape and size of specimen: strip shape, 6 mm in width, and 2 mm in thickness (interval between grippers of 20 mm, average strain of 10%, and strain amplitude of ±0.1%)

A specimen having a change in E' at −30° C. of 21 times or less in terms of the ratio of E' to E' at 60° C. was evaluated as good, and a specimen other than that was evaluated as poor.

(2) The storage modulus E' at 100 Hz was measured at −30° C. to 120° C. under a tensile condition using the viscoelastic spectrometer "DVE-V4" manufactured by UBM.

A specimen having a change in E' at 120° C. of 0.5 times or more in terms of the ratio of E' to E' at 60° C. was evaluated as good, and a specimen other than that was evaluated as poor.

2. Damping Characteristic (tan δ)

tan δ at 100 Hz was measured at −30° C. to 120° C. under a tensile condition using the viscoelastic spectrometer "DVE-V4" manufactured by UBM.

A specimen having a value of tan δ of 0.140 or more at any temperature was evaluated as satisfactory. More specifically, a specimen having tan δ at −30° C. to 120° C. of 0.140 or more was evaluated as good, and a specimen other than that was evaluated as poor. It is to be noted that δ is preferably 0.150 or more, and still more preferably 0.160 or more.

3. Temperature Dependence of Damping Characteristic (tan δ)

tan δ at 100 Hz was measured at −30° C. to 120° C. under a tensile condition using the viscoelastic spectrometer "DVE-V4" manufactured by UBM.

A specimen having a ratio of tan δ at −30° C. to tan δ at 60° C. of 3.5 or less was evaluated as good, and a specimen other than that was evaluated as poor.

4. Durability

A standard specimen (No. 6 dumbbell specimen) in accordance with JIS K6251:2010 was prepared and elongated setting an elongation condition to 0 to 50% using a tensile tester provided with a thermostatic chamber in which the ambient temperature around a gripping jig for gripping this specimen was kept at 120° C.

A constant elongation fatigue test was conducted under the above-described conditions using an elongation fatigue tester "FT-3103" manufactured by UESHIMA SEISAKUSHO CO., LTD. The number of samples was set to N=6, and elongation fatigue was repeated 50000 times.

When 0 to 3 samples ruptured, the durability was evaluated as good, and when 4 or more samples ruptured, the durability was evaluated as poor.

5. Kneadability

With respect to the kneadability, the following two items (1) and (2) were evaluated, a specimen which satisfies both of the two items was evaluated as good, and a specimen which does not satisfy any one of the two items was evaluated as poor.

(1) Kneading time is within 30 minutes.

(2) There is no contamination in kneading machine after discharging compound.

6. Roll Processability

With respect to the roll processability, the following items (1) and (2) were evaluated, a specimen which satisfies both of the two items was evaluated as good, and a specimen which does not satisfy any one of the two items was evaluated as poor.

(1) Having satisfactory roll processability such that a rubber compound is in close contact with a roll without separating from the roll, and a bank rotates smoothly.

(2) Having satisfactory roll processability without interruption due to tacky adhesion of a compound at the time of a turnover work for improving dispersibility or a sheeting work such as sheet feeding.

7. Moldability

With respect to the moldability, the following items (1) to (3) were evaluated, a specimen which satisfies all the tree items was evaluated as good, and a specimen which does not satisfy any one of the tree items was evaluated as poor.

(1) Having stable vulcanization moldability without occurrence of compound burning, defective compound flowing, foaming, and the like under vulcanization conditions.

(2) Having small surface tackiness without occurrence of bleeding and the like at a surface of a vulcanized sheet.

(3) Having stable vulcanization moldability without occurrence of tacky adhesion to a mold and excessive mold contamination at the time of vulcanization molding, and other problems.

TABLE 1

| | | Example 1 | Example 2 | Example 3 | Example 4 | Example 5 | Example 6 |
|---|---|---|---|---|---|---|---|
| Blend (parts by weight) | EPDM-1 | 100 | 100 | 100 | 100 | 100 | 100 |
| | EPDM-2 | | | | | | |
| | EBDM-1 | | | | | | |
| | HAF Carbon black | 80 | 80 | 80 | 80 | 80 | 80 |
| | ISAF-LS Carbon black | | | | | | |
| | Graphite | 10 | 10 | 10 | 10 | 10 | 10 |
| | Liquid polyolefin oligomer (Mn: 3000 to 3700) | 20 | 20 | 20 | 20 | 20 | 50 |
| | Peroxide-based crosslinking agent | 1 | 1.5 | 2.5 | 3.0 | 3.5 | 1.5 |

TABLE 1-continued

| | | | | | | | |
|---|---|---|---|---|---|---|---|
| Polymer characteristic | C3, C4 content (wt %) | 43.4 | | 43.4 | | 43.4 | | 43.4 | | 43.4 | | 43.4 | |
| Damping characteristic (tan δ) | tan δ (−30° C.) | 0.535 | | 0.534 | | 0.534 | | 0.534 | | 0.534 | | 0.629 | |
| | tan δ (23° C.) | 0.180 | | 0.170 | | 0.168 | | 0.166 | | 0.165 | | 0.244 | |
| | tan δ (60° C.) | 0.214 | | 0.196 | | 0.182 | | 0.175 | | 0.168 | | 0.259 | |
| | tan δ (120° C.) | 0.260 | | 0.219 | | 0.188 | | 0.172 | | 0.157 | | 0.280 | |
| | Minimum tan δ (−30° C. to 120° C.) | 0.180 | Good | 0.170 | Good | 0.163 | Good | 0.160 | Good | 0.157 | Good | 0.242 | Good |
| Temperature dependence of damping characteristic (tan δ) | tan δ (−30° C./60° C.) | 2.49 | Good | 2.72 | Good | 2.95 | Good | 3.07 | Good | 3.19 | Good | 2.43 | Good |
| Temperature characteristic of vibration characteristic (E') | E' (−30° C./60° C.) | 8.86 | Good | 8.35 | Good | 7.95 | Good | 7.75 | Good | 7.55 | Good | 9.54 | Good |
| | E' (120° C./60° C.) | 0.53 | Good | 0.57 | Good | 0.61 | Good | 0.63 | Good | 0.65 | Good | 0.56 | Good |
| Durability | | Good | | Good | | Good | | Good | | Good | | Good | |
| Kneadability | | Good | | Good | | Good | | Good | | Good | | Good | |
| Roll processability | | Good | | Good | | Good | | Good | | Good | | Good | |
| Moldability | | Good | | Good | | Good | | Good | | Good | | Good | |

| | | | Example 7 | | Example 8 | | Example 9 | | Example 10 | | Example 11 | |
|---|---|---|---|---|---|---|---|---|---|---|---|---|
| Blend (parts by weight) | EPDM-1 | | 100 | | 100 | | 100 | | 100 | | | |
| | EPDM-2 | | | | | | | | | | | |
| | EBDM-1 | | | | | | | | | | 100 | |
| | HAF Carbon black | | 80 | | 80 | | 80 | | 80 | | 80 | |
| | ISAF-LS Carbon black | | | | | | | | | | | |
| | Graphite | | 10 | | 10 | | 3 | | 30 | | 10 | |
| | Liquid polyolefin oligomer (Mn: 3000 to 3700) | | 5 | | 10 | | 20 | | 20 | | 20 | |
| | Peroxide-based crosslinking agent | | 1.5 | | 1.5 | | 1.5 | | 1.5 | | 1.5 | |
| Polymer characteristic | C3, C4 content (wt %) | | 43.4 | | 43.4 | | 43.4 | | 43.4 | | 46.2 | |
| Damping characteristic (tan δ) | tan δ (−30° C.) | | 0.516 | | 0.544 | | 0.607 | | 0.557 | | 0.550 | |
| | tan δ (23° C.) | | 0.147 | | 0.156 | | 0.174 | | 0.188 | | 0.180 | |
| | tan δ (60° C.) | | 0.166 | | 0.179 | | 0.195 | | 0.210 | | 0.186 | |
| | tan δ (120° C.) | | 0.199 | | 0.210 | | 0.227 | | 0.240 | | 0.200 | |
| | Minimum tan δ (−30° C. to 120° C.) | | 0.146 | Good | 0.156 | Good | 0.174 | Good | 0.188 | Good | 0.179 | Good |
| Temperature dependence of damping characteristic (tan δ) | tan δ (−30° C./60° C.) | | 3.11 | Good | 3.04 | Good | 3.11 | Good | 2.65 | Good | 2.96 | Good |
| Temperature characteristic of vibration characteristic (E') | E' (−30° C./60° C.) | | 11.5 | Good | 10.6 | Good | 10.2 | Good | 10.9 | Good | 7.41 | Good |
| | E' (120° C./60° C.) | | 0.56 | Good | 0.56 | Good | 0.58 | Good | 0.53 | Good | 0.59 | Good |
| Durability | | | Good | | Good | | Good | | Good | | Good | |
| Kneadability | | | Good | | Good | | Good | | Good | | Good | |
| Roll processability | | | Good | | Good | | Good | | Good | | Good | |
| Moldability | | | Good | | Good | | Good | | Good | | Good | |

TABLE 2

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Blend (parts by weight) | EPDM-1 | 100 | 100 | 100 | 100 |  | 100 | 100 |
|  | EPDM-2 |  |  |  |  | 100 |  |  |
|  | EBDM-1 |  |  |  |  |  |  |  |
|  | HAF Carbon black | 80 | 80 | 80 | 80 | 80 | 80 |  |
|  | ISAF-LS Carbon black |  |  |  |  |  |  | 80 |
|  | Graphite | 10 | 0 | 10 | 10 | 10 | 0 | 0 |
|  | Liquid polyolefin oligomer (Mn: 3000 to 3700) | 20 | 50 | 0 | 0 | 20 | 20 | 20 |
|  | Peroxide-based crosslinking agent | 0.5 | 1.5 | 1.5 | 3.5 | 1.5 | 3.5 | 3.5 |
| Polymer characteristic | C3, C4 content (wt %) | 43.4 | 43.4 | 43.4 | 43.4 | 28.9 | 43.4 | 43.4 |
| Damping characteristic (tan δ) | tan δ (−30° C.) | — | 0.58 | 0.49 | 0.48 | 0.22 | 0.59 | 0.52 |
|  | tan δ (23° C.) | — | 0.223 | 0.137 | 0.129 | 0.160 | 0.165 | 0.170 |
|  | tan δ (60° C.) | — | 0.236 | 0.154 | 0.127 | 0.194 | 0.164 | 0.179 |
|  | tan δ (120° C.) | — | 0.257 | 0.188 | 0.123 | 0.242 | 0.155 | 0.160 |
|  | Minimum tan δ (−30° C. to 120° C.) | — | 0.222 Good | 0.136 Poor | 0.123 Poor | 0.159 Good | 0.155 Good | 0.160 Good |
| Temperature dependence of damping characteristic (tan δ) | tan δ (−30° C./60° C.) | — | 2.45 Good | 3.17 Good | 3.82 Poor | 1.15 Good | 3.58 Poor | 2.90 Good |
| Temperature characteristic of vibration characteristic (E') | E' (−30° C./60° C.) | — | 8.33 Good | 12.5 Good | 7.90 Good | 28.7 Poor | 8.78 Good | 9.29 Good |
|  | E' (120° C./60° C.) | — | 0.57 Good | 0.57 Good | 0.66 Good | 0.41 Poor | 0.66 Good | 0.63 Good |
|  | Durability | — | Good | Good | Poor | Good | Good | Poor |
|  | Kneadability | Good | Poor | Good | Good | Good | Poor | Poor |
|  | Roll processability | Good | Poor | Good | Good | Good | Poor | Poor |
|  | Moldability | Poor | Good | Good | Good | Good | Good | Good |

Evaluation

The following can be seen from Table 2.

In Comparative Example 1, the amount of the peroxide-based crosslinking agent (DCP) is small, and therefore the moldability is deteriorated and molding is difficult.

In Comparative Example 2, a large amount of the liquid polyolefin oligomer (LUCANT HC 2000) is blended, and the damping characteristic is thereby obtained, but graphite (CPB-3S) is not blended, and therefore the kneadability and the roll processability are poor.

In Comparative Example 3 and Comparative Example 4, a liquid polyolefin oligomer (LUCANT HC 2000) is not blended, and therefore the damping characteristic is poor. Further, in Comparative Example 4, a large amount of the peroxide-based crosslinking agent (DCP) is blended, and therefore it can be seen that elongation is small and the durability is deteriorated.

In Comparative Example 5, the change rate of E' at a low temperature (−30° C.) and at a high temperature (120° C.) in terms of the ratio of E' to E' at 60° C. is large due to the change of the polymer to EP51 ((C3, C4) content of 28.9 wt %) to make the temperature dependence unsatisfactory.

In Comparative Example 6, graphite (CPB-3S) is not blended, and therefore the temperature dependence of tan δ is unsatisfactory, and the kneadability and the roll processability are poor.

In Comparative Example 7, a desired damping characteristic is obtained by using the carbon black (ISAF-LS) and increasing the amount of the liquid polyolefin oligomer (LUCANT HC 2000) blended, but the dispersibility at the time of kneading is deteriorated due to the influence of the carbon black (ISAF-LS), resulting in deterioration in the durability. In addition, graphite is not blended, and therefore the kneadability and the roll processability are also deteriorated.

In contrast to the Comparative Examples as described above, it can be seen that, as shown by Examples 1 to 11 in Table 1, the rubber composition for a torsional damper of the present disclosure achieves a high damping performance and has an excellent balance among the physical properties required for the torsional damper and excellent product durability and compound processability.

The invention claimed is:

1. A rubber composition for a torsional damper, comprising:
   (a) at least one polymer selected from the group consisting of EPM, EPDM and EBDM;
   (b) at least one liquid polyolefin oligomer;
   (c) at least one graphite; and
   (d) a peroxide-based crosslinking agent, wherein the rubber composition has a content of propylene and butene of 35 to 55 wt % based on a sum of a total amount of ethylene and propylene in EPM and EPDM each being the polymer of (a) and a total amount of ethylene and butene in EBDM being the polymer of (a), and comprises:
   5 to 50 parts by weight of the liquid polyolefin oligomer of (b) being a liquid polyolefin oligomer having a number average molecular weight Mn in a range of 3,000 to 4,000; and
   0.8 to 3.5 parts by weight of the peroxide-based crosslinkinq agent of (d), based on 100 parts by weight of the polymer of (a); and
   wherein the torsional damper exhibits:
   (A) a minimum value of tan δ at −30° C. to 120° C. of 0.140 or more;
   (B) a ratio of tan δ at −30° C. to tan δ at 60° C. of 3.5 or less; and
   (C) a ratio of E' at −30° C. to E' at 60° C. of 21 or less.

2. The rubber composition for a torsional damper according to claim 1,
wherein the rubber composition for a torsional damper comprises 3 to 50 parts by weight of the graphite of (c).

3. The rubber composition for a torsional damper according to claim 1, wherein the liquid polyolefin oligomer of (b) is an ethylene-α-olefin oligomer.

4. The rubber composition for a torsional damper according to claim 3, wherein the ethylene-α-olefin oligomer is an ethylene-α-olefin oligomer having a number average molecular weight Mn of 3,000 to 3,700, a kinetic viscosity at 100° C. of 2,000 mm$^2$/s, a viscosity index of 300, and a sulfur content of less than 0.1% by mass.

5. The rubber composition for a torsional damper according to claim 1, wherein the graphite is a flake graphite.

6. A torsional damper comprising a rubber composition for a torsional damper, the rubber composition comprising:
(a) at least one polymer selected from the group consisting of EPM, EPDM and EBDM;
(b) at least one liquid polyolefin oligomer;
(c) at least one graphite; and
(d) a peroxide-based crosslinking agent, wherein
the rubber composition has a content of propylene and butene of 35 to 55 wt % based on a sum of a total amount of ethylene and propylene in EPM and EPDM each being the polymer of (a) and a total amount of ethylene and butene in EBDM being the polymer of (a), and comprises:
5 to 50 parts by weight of the liquid polyolefin oligomer of (b) being a liquid polyolefin oligomer having a number average molecular weight Mn in a range of 3,000 to 4,000; and
0.8 to 3.5 parts by weight of the peroxide-based crosslinking agent of (d), based on 100 parts by weight of the polymer of (a); and
wherein the torsional damper exhibits:
(A) a minimum value of tan δ at −30° C. to 120° C. of 0.140 or more;
(B) a ratio of tan δ at −30° C. to tan δ at 60° C. of 3.5 or less; and
(C) a ratio of E' at −30° C. to E' at 60° C. of 21 or less.

7. The rubber composition according to claim 1, wherein the at least one polymer is selected from the group consisting of EPM and EBDM.

8. The rubber composition according to claim 1, wherein the amount of graphite is 3 to 30 parts by weight.

9. The torsional damper according to claim 6, wherein the at least one polymer is selected from the group consisting of EPM and EBDM.

10. The torsional damper according to claim 6, wherein the amount of graphite is 3 to 30 parts by weight.

* * * * *